(12) United States Patent
Speed

(10) Patent No.: US 7,038,388 B1
(45) Date of Patent: May 2, 2006

(54) AUTOMOTIVE SIGNAL LIGHT

(76) Inventor: Thomas M. Speed, 1201 Standish Ct., Fort Collins, CO (US) 80525

( * ) Notice: Subject to any disclaimer, the term of this patent is extended or adjusted under 35 U.S.C. 154(b) by 0 days.

(21) Appl. No.: 11/034,994

(22) Filed: Jan. 12, 2005

(51) Int. Cl.
*H05B 37/00* (2006.01)

(52) U.S. Cl. .................... 315/82; 315/83; 340/458; 340/459

(58) Field of Classification Search ............. None
See application file for complete search history.

(56) References Cited

U.S. PATENT DOCUMENTS 4,401,972 A * 8/1983 Lupoli .................. 340/458

6,507,154 B1 * 1/2003 Menke .................. 315/83

* cited by examiner

*Primary Examiner*—David Vu
(74) *Attorney, Agent, or Firm*—Samuel M. Freund; Cochran Freund & Young LLC

(57) ABSTRACT

An apparatus and method for determining whether the gas pedal, the brake pedal or neither pedal of a motor vehicle is being actuated, is described. Vehicle braking lights may be replaced with signal lights adapted to be observable by drivers of vehicles following a vehicle bearing the subject indicator lights, such that the status of the vehicle ahead can be determined. Additionally, other locations for the present signal lights on a vehicle may provide similar information to drivers and pedestrians viewing the vehicle from other directions.

22 Claims, 2 Drawing Sheets

AUTOMOTIVE SIGNAL LIGHT

FIELD OF THE INVENTION

The present invention relates generally to vehicle signal lights and, more particularly, to the use of vehicle signal lights as indicators of the use of the accelerator, the brake or neither the accelerator or the brake by the user of the vehicle.

BACKGROUND OF THE INVENTION

A large number of automobile, truck and motorcycle accidents occur as a result of motorists following motor vehicles too closely, while having insufficient information to take evasive action when the forward motorist accelerates or decelerates. Additionally, motorists driving at reduced speeds or stopped at intersections or other locations would benefit by having knowledge of whether vehicles approaching from the side or from the rear of the slowed or stopped vehicle are braking or accelerating. Similar information would be valuable to pedestrians as well.

Accordingly, it is an object of the present invention to provide information to motorists and pedestrians such that time to respond to vehicles may be increased.

Another object of the present invention is to provide additional information for motorists following motor vehicles such that time to respond to actions of the vehicle ahead may be increased.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the signal light hereof includes: a first electric light; a second electric light; a third electric light; first means for supplying electric power to the first light, and for preventing electric power from being applied to the second light and the third light when electric power is supplied to the first light; and second means for supplying electric power to the second light when electric power is not being supplied to the first light, and for preventing electric power from being applied to the second light when electric power is supplied to the third light and not to the first light.

In another aspect of the invention and in accordance with its objects and purposes, the motor vehicle signal light hereof includes: a first electric light; a second electric light; a third electric light; a battery; a first normally open electrical switch in electrical connection with the first light and the battery; a first normally closed switch in electrical connection with the battery; means for opening the first normally closed switch when the first normally open switch is closed; a second normally closed electrical switch in electrical connection with the first normally closed switch and the second light, wherein the second light is powered by the battery when the first normally closed switch is closed; a second normally open electrical switch in electrical connection with the second normally closed electrical switch and the third light, wherein the third light is powered by the battery when the first normally closed switch is closed, and the second normally open electrical switch is closed; and means for opening the second normally closed switch when the second normally open switch is closed.

In still another aspect of the invention and in accordance with its objects and purposes, the method for providing information to motorists following motor vehicles hereof includes the steps of: supplying electric power to a first signal light; preventing electric power from being applied to a second signal light and a third signal light when electric power is supplied to the first signal light; supplying electric power to the second signal light when electric power is not being supplied to the first light; and preventing electric power from being applied to the second signal light when electric power is supplied to the third signal light and not to the first signal light.

Benefits and advantages of the present invention include, but are not limited to, the inexpensive addition of signal lights to a motor vehicle such that readily observable information concerning the use of that vehicle's brake, accelerator or neither brake nor accelerator, is provided, and which can be retrofitted to existing vehicles.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Briefly, the present invention includes an apparatus and method for determining whether the gas pedal, the brake pedal or neither pedal of a vehicle is being depressed. Vehicle braking lights may be replaced with three signal lights adapted to be observable by drivers of vehicles following a vehicle outfitted in accordance with the present invention which indicates the status of the vehicle ahead. As an example, when the brake is activated in the vehicle, a red signal light would be illuminated, when the accelerator is activated, a green signal light would be illuminated, and when neither the brake nor the accelerator is activated, a yellow signal light would be illuminated. Clearly, the present invention is applicable to cars, trucks, buses, tractors, motorcycles and scooters, as examples, and the signal lights can achieve their desired coloration by having colored light emitting diodes (LEDs), colored electric lights, or white electric lights having colored lenses, as examples.

The present invention may be implemented in existing vehicles and in newly fabricated vehicles, by changing the red stop lights in the rear of the vehicle to three lights: a green light, a red light and a yellow light. When the gas pedal is depressed, the green light would be illuminated; the red light would be illuminated when the brake pedal is depressed; and the yellow light would be illuminated whenever neither the brake pedal nor the gas pedal were depressed. Actuating the brake pedal may override the other switches such that only the red light is illuminated when the brake is depressed, even if the gas pedal is simultaneously depressed. However, it is anticipated that in another embodiment of the invention, one might permit the green light to be illuminated as well as the red light when both pedals are depressed. It should also be mentioned that the signal lights of the present invention may be placed on a motor vehicle in locations such that they may be observed from the front of the motor vehicle and/or from the side thereof. In this manner, motorists and pedestrians may be apprised of the status of approaching vehicles.

Figure 1:
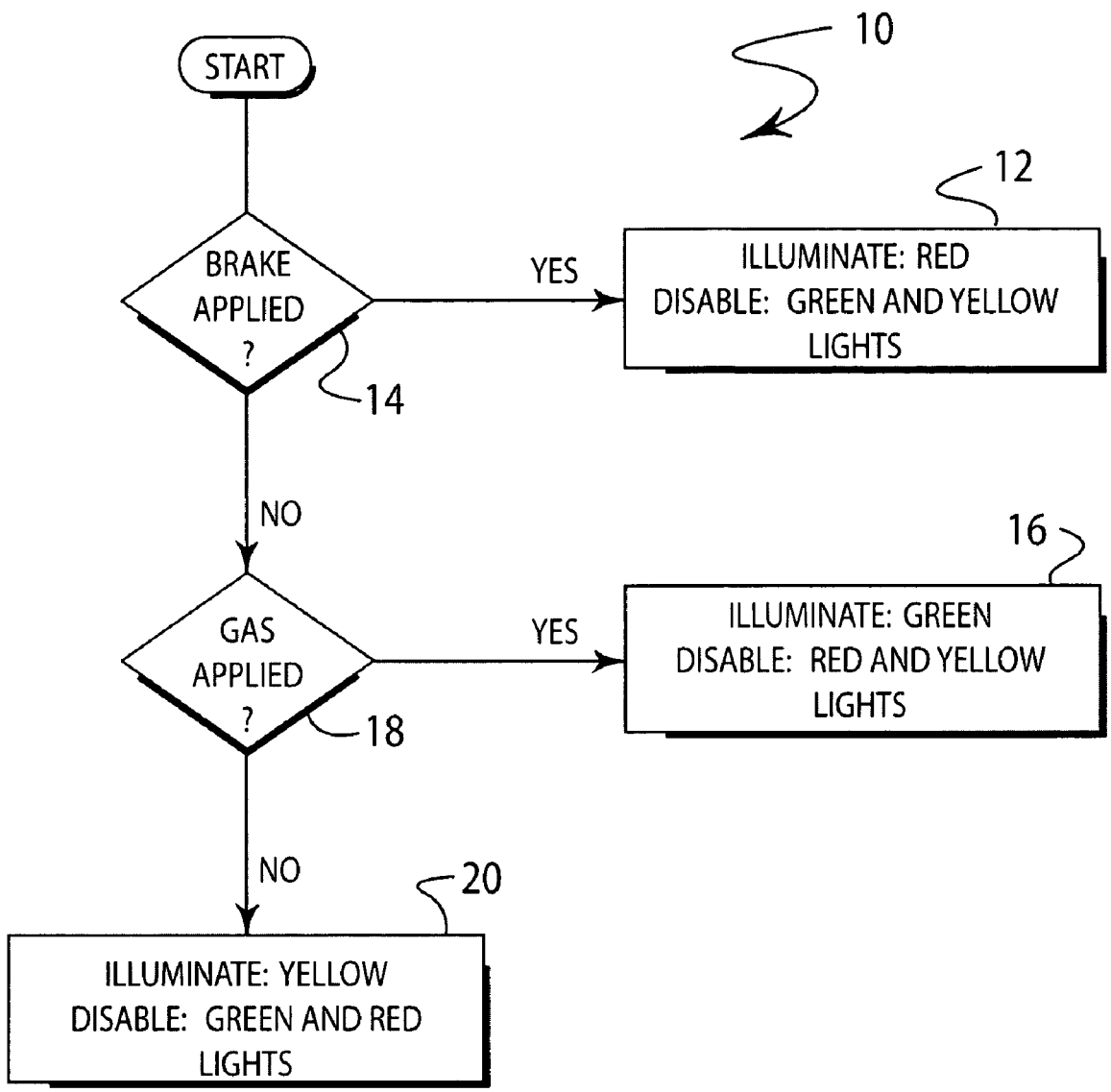
FIG. 1 is a flow diagram of the method of the present invention.

Reference will now be made in detail to the present embodiments of the invention examples of which are illustrated in the accompanying drawings. Turning now to FIG. 1, the method for providing information to motorists following motor vehicles, 10, may include supplying electric power to a first, say a red light, 12, in response to applying the brake of the vehicle, 14, while preventing electric power from being applied to a second light and a third light, for example, green and yellow lights, when electric power is supplied to the first light; supplying electric power to the green light, 16, in response to activating a gas pedal or a throttle, 18, while preventing electric power from being applied to the yellow light when electric power is supplied to the green light and not to the red light; and illuminating the yellow light, 20, when neither the red nor the green lights receive electric power.

Figure 2:
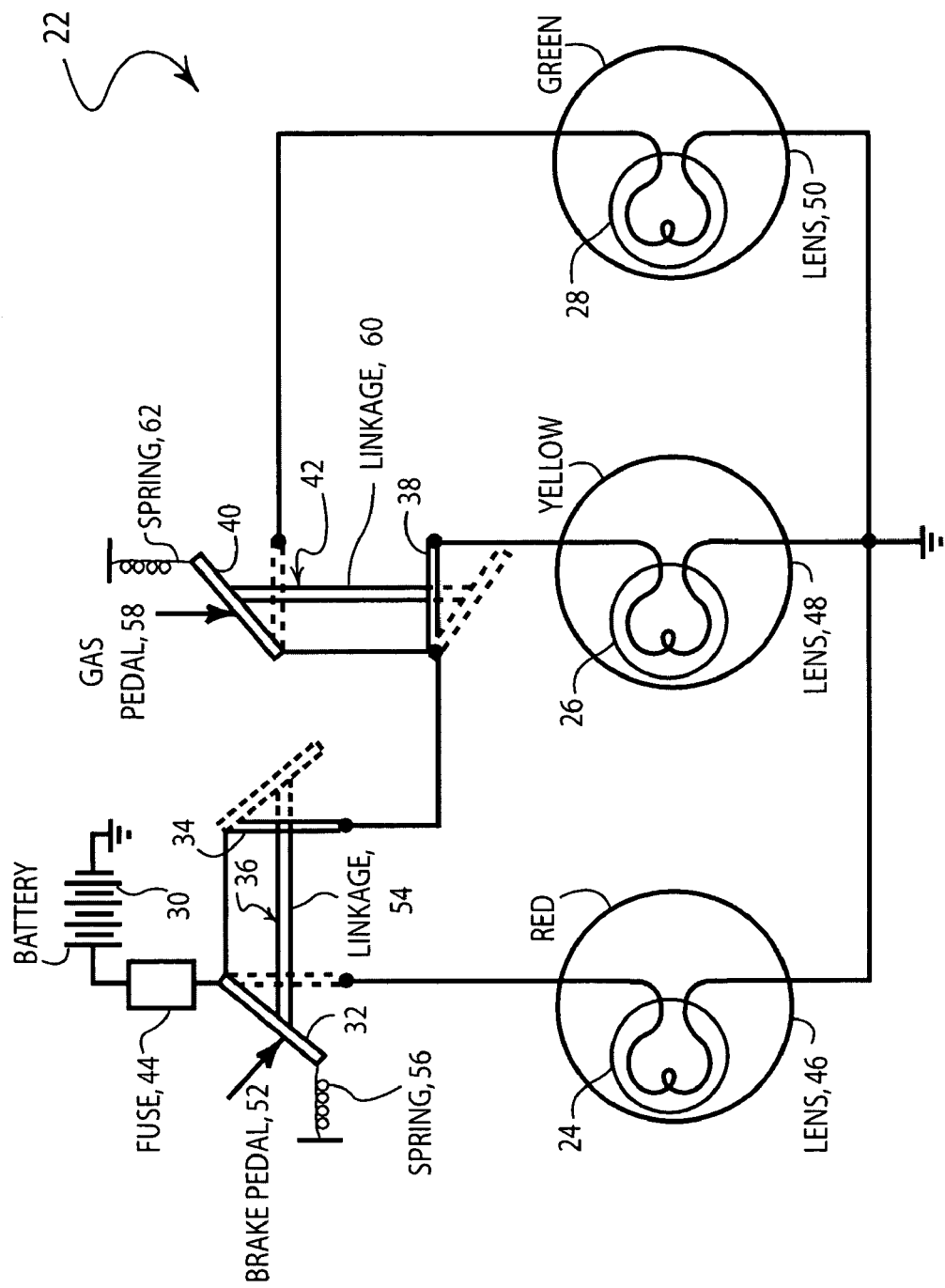
FIG. 2 is a schematic representation of an apparatus for achieving the method of FIG. 1.

FIG. 2 is a schematic representation of one embodiment, 22, of the motor vehicle signal light of the present invention, which may include: first electric light, 24; second electric light, 26; third electric light, 28; battery, 30; first normally open electrical switch, 32, in electrical connection with first electric light 24 and battery 32; first normally closed switch, 34, in electrical connection with battery 32; means, 36, for opening first normally closed electrical switch 34 when first normally open electrical switch 30 is closed; second normally closed electrical switch, 38, in electrical connection with first normally closed switch 34 and second electric light 26, wherein second light 26 is powered by battery 32 when first normally closed switch 34 is closed; second normally open electrical switch, 40, in electrical connection with second normally closed electrical switch 38 and third light 28, wherein third light 28 is powered by battery 32 when first normally closed switch 34 is closed, and second normally open electrical switch 40 is closed; and means, 42, for opening second normally closed switch 38 when second normally open switch 40 is closed. Shown also in FIG. 2 is fuse, 44, and lenses, 46, 48, and 50, although as stated hereinabove, colored LEDs or colored light bulbs, as examples, can be used to provide distinguishing colors. Means, 36, for opening first normally closed electrical switch 34 when first normally open electrical switch 30 is closed, is shown in FIG. 2 as brake pedal, 52, linkage, 54, and return spring, 56, as an example. Means, 42, for opening second normally closed switch 38 when second normally open switch 40 is closed, is shown in FIG. 2 as gas pedal, 58, linkage, 60, and return spring, 62. In the situation where the present invention was installed on a motorcycle or scooter, the gas pedal would be replaced by a throttle as the accelerator.

Clearly, electronic components can be used in place of and serving the function of these electromechanical components.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A signal light, comprising in combination:
   (a) a first electric light;
   (b) a second electric light;
   (c) a third electric light;
   (d) first means for supplying electric power to said first light, and for preventing electric power from being applied to said second light and said third light when electric power is supplied to said first light; and
   (e) second means for supplying electric power to said second light when electric power is not being supplied to said first light, and for preventing electric power from being applied to said second light when electric power is supplied to said third light and not to said first light.

2. The signal light of claim 1, wherein said first means comprises a battery; a first normally open electrical switch in electrical connection with said first light and said battery; a first normally closed electrical switch in electrical connection with said battery; and means for opening said first normally closed switch when said first normally open switch is closed.

3. The light of claim 2, wherein said second means comprises a second normally closed electrical switch in electrical connection with said first normally closed switch and said second light; and a second normally open electrical switch in electrical connection with said second normally closed electrical switch and said third light; and means for opening said second normally closed switch when said second normally open switch is closed.

4. The light of claim 3, wherein said first normally open switch is responsive to the position of a motor vehicle braking actuator, and said second normally open switch is responsive to the position of a motor vehicle accelerator actuator.

5. The light of claim 4, wherein said first light comprises a red reflector, said second light comprises a yellow reflector, and said third light comprises a green reflector.

6. The light of claim 4, wherein said means for opening said first normally closed switch when said first normally open switch is closed comprises a mechanical linkage, and said means for opening said second normally closed switch when said second normally open switch is closed comprises a mechanical linkage.

7. The light of claim 4, wherein said vehicle braking actuator comprises a brake pedal, and said vehicle accelerator actuator comprises a gas pedal.

8. The light of claim 4, wherein said motor vehicle braking actuator comprises a brake pedal, and said motor vehicle accelerator actuator comprises a throttle.

9. The light of claim 4, wherein said motor vehicle is selected from the group consisting of automobiles, trucks, tractors, motorcycles, and scooters.

10. A motor vehicle signal light, comprising in combination:
    (a) a first electric light;
    (b) a second electric light;
    (c) a third electric light;
    (d) a battery;
    (e) a first normally open electrical switch in electrical connection with said first light and said battery;
    (f) a first normally closed switch in electrical connection with said battery;

(g) means for opening said first normally closed switch when said first normally open switch is closed;

(h) a second normally closed electrical switch in electrical connection with said first normally closed switch and said second light, wherein said second light is powered by said battery when said first normally closed switch is closed;

(i) a second normally open electrical switch in electrical connection with said second normally closed electrical switch and said third light, wherein said third light is powered by said battery when said first normally closed switch is closed, and said second normally open electrical switch is closed; and (j) means for opening said second normally closed switch when said second normally open switch is closed.

11. The motor vehicle signal light of claim 10, wherein said first normally open switch is responsive to the position of a motor vehicle braking actuator, and said second normally open switch is responsive to the position of a motor vehicle accelerator actuator.

12. The motor vehicle signal light of claim 11, wherein said first light comprises a red reflector, said second light comprises a yellow reflector, and said third light comprises a green reflector.

13. The motor vehicle signal light of claim 11, wherein said means for opening said first normally closed switch when said first normally open switch is closed comprises a mechanical linkage, and said means for opening said second normally closed switch when said second normally open switch is closed comprises a mechanical linkage.

14. The motor vehicle signal light of claim 11, wherein said vehicle braking actuator comprises a brake pedal, and said vehicle accelerator actuator comprises a gas pedal.

15. The motor vehicle signal light of claim 11, wherein said motor vehicle braking actuator comprises a brake pedal, and said motor vehicle accelerator actuator comprises a throttle.

16. The motor vehicle signal light of claim 11, wherein said motor vehicle is selected from the group consisting of automobiles, trucks, tractors, motorcycles, and scooters.

17. A method for providing information to motorists following motor vehicles, comprising the steps of:

supplying electric power to a first light;

preventing electric power from being applied to a second light and a third light when electric power is supplied to the first light;

supplying electric power to the second light when electric power is not being supplied to the first light; and preventing electric power from being applied to the second light when electric power is supplied to the third light and not to the first light.

18. The method for providing information to motorists following motor vehicles of claim 17, wherein said step of supplying electric power to a first light is in response to the position of a motor vehicle braking actuator, and said step of preventing electric power from being applied to a second light and a third light when electric power is supplied to the first light, is in response to the position of a motor vehicle accelerator actuator.

19. The method for providing information to motorists following motor vehicles of claim 18, wherein the first light comprises a red reflector, the second light comprises a yellow reflector, and the third light comprises a green reflector.

20. The method for providing information to motorists following motor vehicles of claim 18, wherein the vehicle braking actuator comprises a brake pedal, and the vehicle accelerator actuator comprises a gas pedal.

21. The method for providing information to motorists following motor vehicles of claim 18, wherein the motor vehicle braking actuator comprises a brake pedal, and said motor vehicle accelerator actuator comprises a throttle.

22. The method for providing information to motorists following motor vehicles of claim 17, wherein the motor vehicle is selected from the group consisting of automobiles, trucks, tractors, motorcycles, and scooters.

* * * * *